United States Patent
Kuo et al.

(10) Patent No.: US 11,711,167 B2
(45) Date of Patent: Jul. 25, 2023

(54) APPARATUS, METHOD AND COMPUTER PROGRAM

(71) Applicant: Nokia Technologies Oy, Espoo (FI)

(72) Inventors: Ping-Heng Kuo, Bristol (GB); Dawid Koziol, Wroclaw (PL); Matthew Baker, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/285,976

(22) PCT Filed: Nov. 1, 2018

(86) PCT No.: PCT/EP2018/079956
§ 371 (c)(1),
(2) Date: Apr. 16, 2021

(87) PCT Pub. No.: WO2020/088771
PCT Pub. Date: May 7, 2020

(65) Prior Publication Data
US 2021/0385017 A1    Dec. 9, 2021

(51) Int. Cl.
*H04L 1/08*     (2006.01)
*H04L 1/1867*   (2023.01)
*H04L 5/00*     (2006.01)
*H04W 72/566*   (2023.01)

(52) U.S. Cl.
CPC .............. *H04L 1/08* (2013.01); *H04L 1/1874* (2013.01); *H04L 5/0032* (2013.01); *H04W 72/569* (2023.01)

(58) Field of Classification Search
None
See application file for complete search history.

(56) References Cited

U.S. PATENT DOCUMENTS

| | | | |
|---|---|---|---|
| 2002/0154656 A1* | 10/2002 | Kitchin | H04W 72/1236 370/468 |
| 2007/0109996 A1* | 5/2007 | Jung | H04L 1/08 370/469 |
| 2009/0075668 A1* | 3/2009 | Rao | H04W 72/1221 455/452.2 |

(Continued)

FOREIGN PATENT DOCUMENTS

| | | | | |
|---|---|---|---|---|
| EP | 2575307 A1 | * | 4/2013 | ............. H04L 47/38 |
| KR | 20080089728 A | * | 10/2008 | |
| WO | WO-2017049425 A1 | * | 3/2017 | ............ H04W 72/04 |

OTHER PUBLICATIONS

3GPP TSG-RAN WG#2 #103bis, Chengdu, China, Oct. 8-12, 2018, Tdoc R2-1814814, "Resource efficient data duplication", Ericson, 2 pgs.

(Continued)

*Primary Examiner* — The Hy Nguyen
(74) *Attorney, Agent, or Firm* — Joseph C. Drish; Harrington & Smith

(57) ABSTRACT

There is provided an apparatus, said apparatus including circuitry configured for causing a plurality of data packets to be transmitted, in at least a first mode, determining at least one of the plurality of data packets based on at least one criterion based on at least one transmission parameter of at least one part of one of the plurality of data packets and causing a duplicate of the at least one determined data packet to be transmitted.

24 Claims, 11 Drawing Sheets

(56) References Cited

U.S. PATENT DOCUMENTS

| | | | | |
|---|---|---|---|---|
| 2009/0209265 A1* | 8/2009 | Kwon | ................... | H04W 24/02 |
| | | | | 455/454 |
| 2009/0259910 A1* | 10/2009 | Lee | ................... | H04W 74/0833 |
| | | | | 714/748 |
| 2011/0064158 A1* | 3/2011 | Li | ..................... | H04B 7/0486 |
| | | | | 375/267 |
| 2018/0279168 A1* | 9/2018 | Jheng | ..................... | H04L 5/001 |
| 2018/0310202 A1 | 10/2018 | Lohr et al. | | |
| 2018/0324642 A1* | 11/2018 | Yu | ..................... | H04L 5/0053 |
| 2018/0368132 A1* | 12/2018 | Babaei | ................ | H04W 72/042 |
| 2018/0368157 A1* | 12/2018 | Jeon | ..................... | H04L 5/0094 |
| 2019/0254117 A1* | 8/2019 | Chen | ..................... | H04L 47/34 |
| 2021/0029777 A1* | 1/2021 | Lv | ..................... | H04W 76/38 |
| 2021/0058285 A1* | 2/2021 | Wu | ..................... | H04B 7/088 |
| 2022/0104309 A1* | 3/2022 | Yang | ..................... | H04L 1/08 |

OTHER PUBLICATIONS

3GPP TSG RAN WG3 NR Adhoc, Sophia Antipolis, France, Jun. 22-26, 2018, R3-180135, "Consideration on fact duplication activation and deactivation over F1", ZTE, 6 pgs.

\* cited by examiner

APPARATUS, METHOD AND COMPUTER PROGRAM

CROSS REFERENCE TO RELATED APPLICATION

This patent application is a U.S. National Stage application of International Patent Application Number PCT/EP2018/079956 filed Nov. 1, 2018, which is hereby incorporated by reference in its entirety.

FIELD

The present application relates to a method, apparatus, system and computer program and in particular but not exclusively to packet duplication in ultra-reliable low latency communication (URLLC).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically, operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus, said apparatus comprising means for causing a plurality of data packets to be transmitted, in at least a first mode, determining at least one of the plurality of data packets based on at least one criterion based on at least one transmission parameter of at least one part of one of the plurality of data packets and causing a duplicate of the at least one determined data packet to be transmitted.

The plurality of data packets may comprise data packets associated with a radio bearer.

The apparatus may comprise means for receiving an indication to operate in one of at least the first mode and a second mode, wherein in the second mode the apparatus comprises means for causing a duplicate of each of the plurality of data packets to be transmitted.

The apparatus may comprise means for receiving an indication to transmit the duplicate of the at least one determined data packet in at least one reserved radio resource.

The indication may comprise configuration of logical channel prioritization restrictions.

The apparatus may comprise means for receiving, from a lower layer, an indication of the at least one transmission parameter.

The apparatus may comprise means for receiving an indication of the at least one criterion.

The apparatus may comprise means for storing the duplicate of the at least one data packet in a buffer for a first time period.

The at least one transmission parameter may comprise one of:
 the modulation order of the at least one part of the at least one data packet,
 the code rate of the at least one part of the at least one data packet,
 the transmission power of the at least one part of the at least one data packet,
 the power headroom of the apparatus at the time of transmission of the at least one part of the at least one data packet,
 a number of negative acknowledgements received in response to transmission of data of the at least one data packet,
 the type of grant associated with transmission of the at least one part of the at least one data packet,
 an indication contained in a grant associated with transmission of the at least one part of the at least one data packet,
 a number of repetitions associated with transmission of the at least one part of the at least one data packet,
 a subcarrier spacing of the at least one part of the at least one data packet,
 a transmission duration of the at least one part of the at least one data packet,
 a multiple-input-multiple-output codebook parameter of the at least one part of the at least one data packet,
 a resource orthogonality mode of the at least one part of the at least one data packet,
 a beam failure or beam recovery status of the at least one data packet,
 a bandwidth of the at least one part of the at least one data packet, and
 a licensing status of spectrum used for transmission of the at least one part of the at least one data packet.

The data packets may be protocol data units, PDUs, of a packet data convergence protocol, PDCP, sublayer.

The apparatus may comprise a user equipment.

The apparatus may comprise network equipment.

The apparatus may comprise means for causing the plurality of data packets to be transmitted from a first base station, and the duplicate of the at least one determined data packet to be transmitted from a second base station.

The apparatus may comprise means for causing the plurality of data packets to be transmitted on a first carrier frequency, and the duplicate of the at least one determined data packet to be transmitted on a second carrier frequency.

In a second aspect, there is provided a method comprising causing a plurality of data packets to be transmitted, In at least a first mode, determining at least one of the plurality of data packets based on at least one criterion based on at least one transmission parameter of at least one part of one of the plurality of data packets and causing a duplicate of the at least one determined data packet to be transmitted.

The plurality of data packets may comprise data packets associated with a radio bearer.

The method may comprise receiving an indication to operate in one of at least the first mode and a second mode, wherein in the second mode the apparatus comprises means for causing a duplicate of each of the plurality of data packets to be transmitted.

The method may comprise receiving an indication to transmit the duplicate of the at least one determined data packet in at least one reserved radio resource.

The indication may comprise configuration of logical channel prioritization restrictions.

The method may comprise receiving, from a lower layer, an indication of the at least one transmission parameter.

The method may comprise receiving an indication of the at least one criterion.

The method may comprise storing the duplicate of the at least one data packet in a buffer for a first time period.

The at least one transmission parameter may comprise one of:
 the modulation order of the at least one part of the at least one data packet,
 the code rate of the at least one part of the at least one data packet,
 the transmission power of the at least one part of the at least one data packet,
 the power headroom of the apparatus at the time of transmission of the at least one part of the at least one data packet,
 a number of negative acknowledgements received in response to transmission of data of the at least one data packet,
 the type of grant associated with transmission of the at least one part of the at least one data packet,
 an indication contained in a grant associated with transmission of the at least one part of the at least one data packet,
 a number of repetitions associated with transmission of the at least one part of the at least one data packet,
 a subcarrier spacing of the at least one part of the at least one data packet,
 a transmission duration of the at least one part of the at least one data packet,
 a multiple-input-multiple-output codebook parameter of the at least one part of the at least one data packet,
 a resource orthogonality mode of the at least one part of the at least one data packet,
 a beam failure or beam recovery status of the at least one data packet,
 a bandwidth of the at least one part of the at least one data packet, and
 a licensing status of spectrum used for transmission of the at least one part of the at least one data packet.

The data packets may be protocol data units, PDUs, of a packet data convergence protocol, PDCP, sublayer.

The method may be performed at a user equipment.

The method may be performed at a network equipment.

The method may comprise causing the plurality of data packets to be transmitted from a first base station, and the duplicate of the at least one determined data packet to be transmitted from a second base station.

The method may comprise causing the plurality of data packets to be transmitted on a first carrier frequency, and the duplicate of the at least one determined data packet to be transmitted on a second carrier frequency.

In a third aspect, there is provided an apparatus comprising at least one processor and at least one memory including a computer program code, the at least one memory and computer program code configured to, with the at least one processor, cause the apparatus at least to: cause a plurality of data packets to be transmitted, in at least a first mode, determine at least one of the plurality of data packets based on at least one criterion based on at least one transmission parameter of at least one part of one of the plurality of data packets and cause a duplicate of the at least one determined data packet to be transmitted.

The plurality of data packets may comprise data packets associated with a radio bearer.

The apparatus may be configured to receive an indication to operate in one of at least the first mode and a second mode, wherein in the second mode the apparatus may be configured to cause a duplicate of each of the plurality of data packets to be transmitted.

The apparatus may be configured to receive an indication to transmit the duplicate of the at least one determined data packet in at least one reserved radio resource.

The indication may comprise configuration of logical channel prioritization restrictions.

The apparatus may be configured to receive, from a lower layer, an indication of the at least one transmission parameter.

The apparatus may be configured to receive an indication of the at least one criterion.

The apparatus may be configured to store the duplicate of the at least one data packet in a buffer for a first time period.

The at least one transmission parameter may comprise one of:
 the modulation order of the at least one part of the at least one data packet,
 the code rate of the at least one part of the at least one data packet,
 the transmission power of the at least one part of the at least one data packet,
 the power headroom of the apparatus at the time of transmission of the at least one part of the at least one data packet,
 a number of negative acknowledgements received in response to transmission of data of the at least one data packet,
 the type of grant associated with transmission of the at least one part of the at least one data packet,
 an indication contained in a grant associated with transmission of the at least one part of the at least one data packet, a number of repetitions associated with transmission of the at least one part of the at least one data packet, a subcarrier spacing of the at least one part of the at least one data packet, a transmission duration of the at least one part of the at least one data packet, a multiple-input-multiple-output codebook parameter of the at least one part of the at least one data packet, a resource orthogonality mode of the at least one part of the at least one data packet, a beam failure or beam recovery status of the at least one data packet, a bandwidth of the at least one part of the at least one data packet, and a licensing status of spectrum used for transmission of the at least one part of the at least one data packet.

The data packets may be protocol data units, PDUs, of a packet data convergence protocol, PDCP, sublayer.

The apparatus may comprise a user equipment.

The apparatus may comprise network equipment.

The apparatus may be configured to cause the plurality of data packets to be transmitted from a first base station, and the duplicate of the at least one determined data packet to be transmitted from a second base station.

The apparatus may be configured to cause the plurality of data packets to be transmitted on a first carrier frequency, and the duplicate of the at least one determined data packet to be transmitted on a second carrier frequency.

In a fourth aspect there is provided a computer readable medium comprising program instructions for causing an apparatus to perform at least the following causing a plurality of data packets to be transmitted, in at least a first mode, determining at least one of the plurality of data packets based on at least one criterion based on at least one transmission parameter of at least one part of one of the plurality of data packets and causing a duplicate of the at least one determined data packet to be transmitted.

The plurality of data packets may comprise data packets associated with a radio bearer.

The apparatus may be caused to perform receiving an indication to operate in one of at least the first mode and a second mode, wherein in the second mode the apparatus may be caused to perform causing a duplicate of each of the plurality of data packets to be transmitted.

The apparatus may be caused to perform receiving an indication to transmit the duplicate of the at least one determined data packet in at least one reserved radio resource.

The indication may comprise configuration of logical channel prioritization restrictions.

The apparatus may be caused to perform receiving, from a lower layer, an indication of the at least one transmission parameter.

The apparatus may be caused to perform receiving an indication of the at least one criterion.

The apparatus may be caused to perform storing the duplicate of the at least one data packet in a buffer for a first time period.

The at least one transmission parameter may comprise one of:

the modulation order of the at least one part of the at least one data packet, the code rate of the at least one part of the at least one data packet, the transmission power of the at least one part of the at least one data packet, the power headroom of the apparatus at the time of transmission of the at least one part of the at least one data packet, a number of negative acknowledgements received in response to transmission of data of the at least one data packet, the type of grant associated with transmission of the at least one part of the at least one data packet, an indication contained in a grant associated with transmission of the at least one part of the at least one data packet, a number of repetitions associated with transmission of the at least one part of the at least one data packet, a subcarrier spacing of the at least one part of the at least one data packet, a transmission duration of the at least one part of the at least one data packet, a multiple-input-multiple-output codebook parameter of the at least one part of the at least one data packet, a resource orthogonality mode of the at least one part of the at least one data packet, a beam failure or beam recovery status of the at least one data packet, a bandwidth of the at least one part of the at least one data packet, and a licensing status of spectrum used for transmission of the at least one part of the at least one data packet.

The data packets may be protocol data units, PDUs, of a packet data convergence protocol, PDCP, sublayer.

The apparatus may comprise a user equipment.

The apparatus may comprise network equipment.

The apparatus may be caused to perform causing the plurality of data packets to be transmitted from a first base station, and the duplicate of the at least one determined data packet to be transmitted from a second base station.

The apparatus may be caused to perform causing the plurality of data packets to be transmitted on a first carrier frequency, and the duplicate of the at least one determined data packet to be transmitted on a second carrier frequency.

In a fifth aspect there is provided a non-transitory computer readable medium comprising program instructions for causing an apparatus to perform at least the method according to the second aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
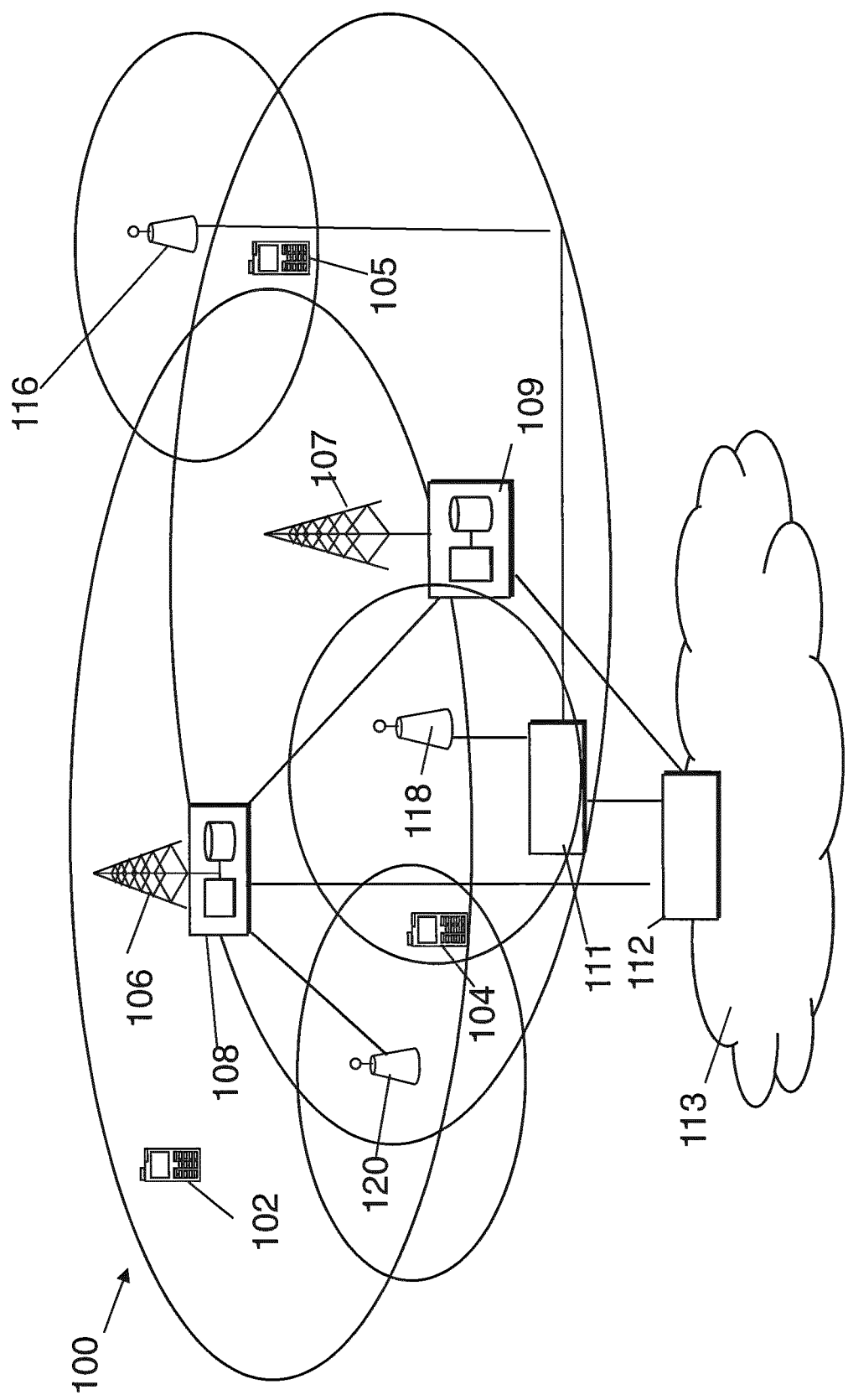
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input —multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF Is controlled by an SMF (Session Management Function) that receives policies from a PCF (Policy Control Function). The CN may also include an AMF (Access & Mobility Function).

Figure 2:
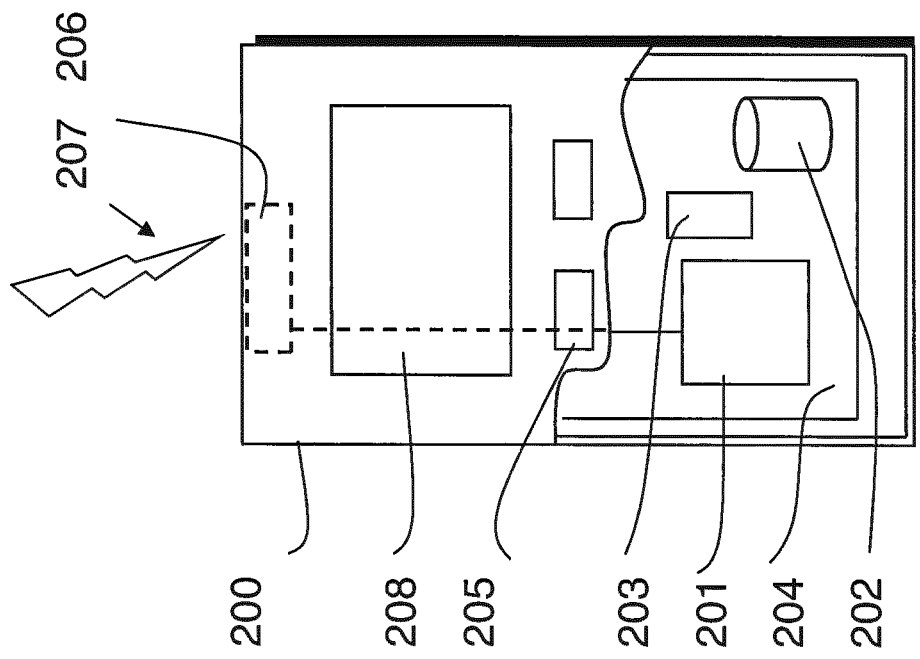
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
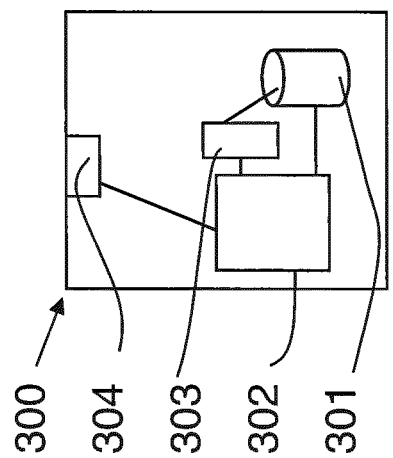
FIG. 3 shows a schematic diagram of an example control apparatus.

FIG. 3 shows an example of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Ultra-Reliable Low Latency Communications (URLLC) is a feature of 5G that may enable support of emerging applications in different verticals beyond conventional telecommunication services. The targeted use cases of URLLC include various delay-sensitive applications such as tactile internet, autonomous driving, and smart factories. The first industrial standard of 5G communications, namely 3GPP Release-15, introduces several enhancements across multiple radio access networks (RAN) protocol layers in a bid to meet the challenging goals of URLLC. For instances, the Layer-1 has adopted frame structures with flexible transmission time intervals (TTIs) and mixed numerologies. In each sublayer of the Layer-2, modifications have been made in the protocols to reduce the potential processing delay.

By utilizing the framework of carrier aggregation (CA) and dual-connectivity (DC) originated from previous releases, PDCP duplication has been employed in Release-15 as an approach to tackle the challenges of URLLC. For example, redundant PDCP PDUs are processed and transmitted over independent paths (e.g. different component carriers in CA, or different nodes in DC) which may achieve diversity gain. Such a scheme may increase the probability of successful communication, because when the receiver fails to decode a PDCP PDU, it can exploit the redundant version to recover the data in time, which may improve both reliability and latency performance. On the other hand, if the receiver is able to decode one of the copies successfully, the other copy of the PDCP PDU will be discarded by the receiver.

PDCP duplication in Release-15 may be conducted with either Carrier Aggregation (CA) or Dual Connectivity (DC).

Figure 4:
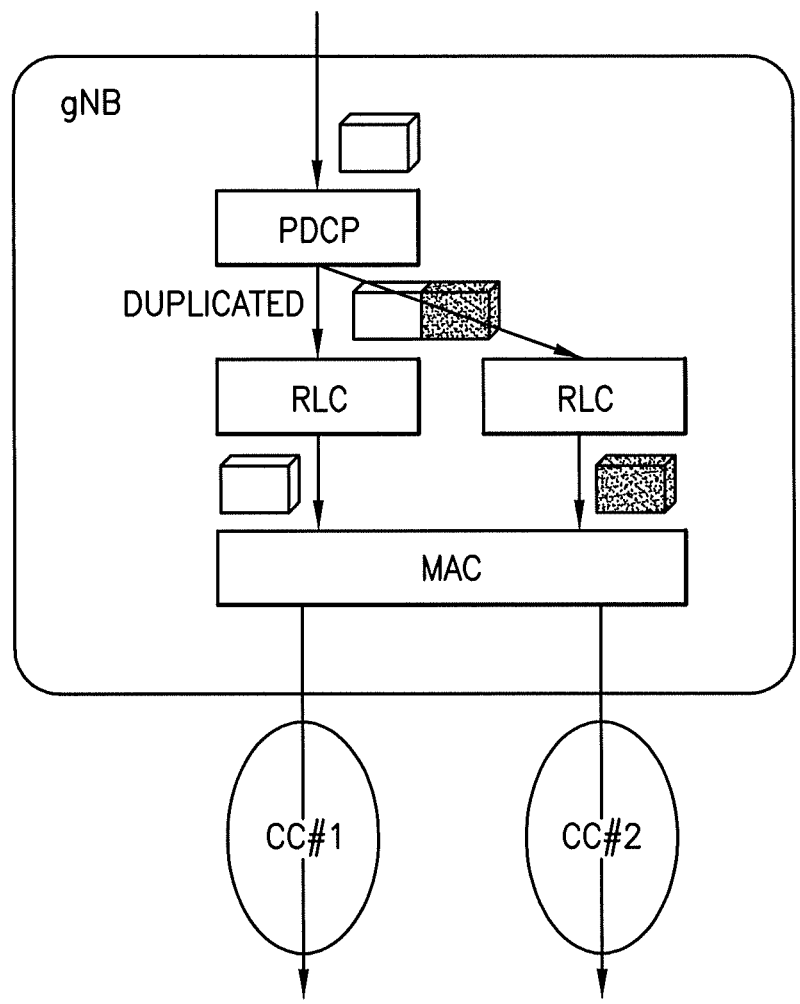
FIG. 4 shows an example block diagram of PDCP PDU duplication.

FIG. 4 shows a CA-based PDCP duplication scheme for downlink. With CA, a separate RLC sublayer is established to handle the duplicated PDCP PDU, then the two corresponding RLC PDUs will be passed to a single MAC entity and mapped to different component carriers.

Figure 5:
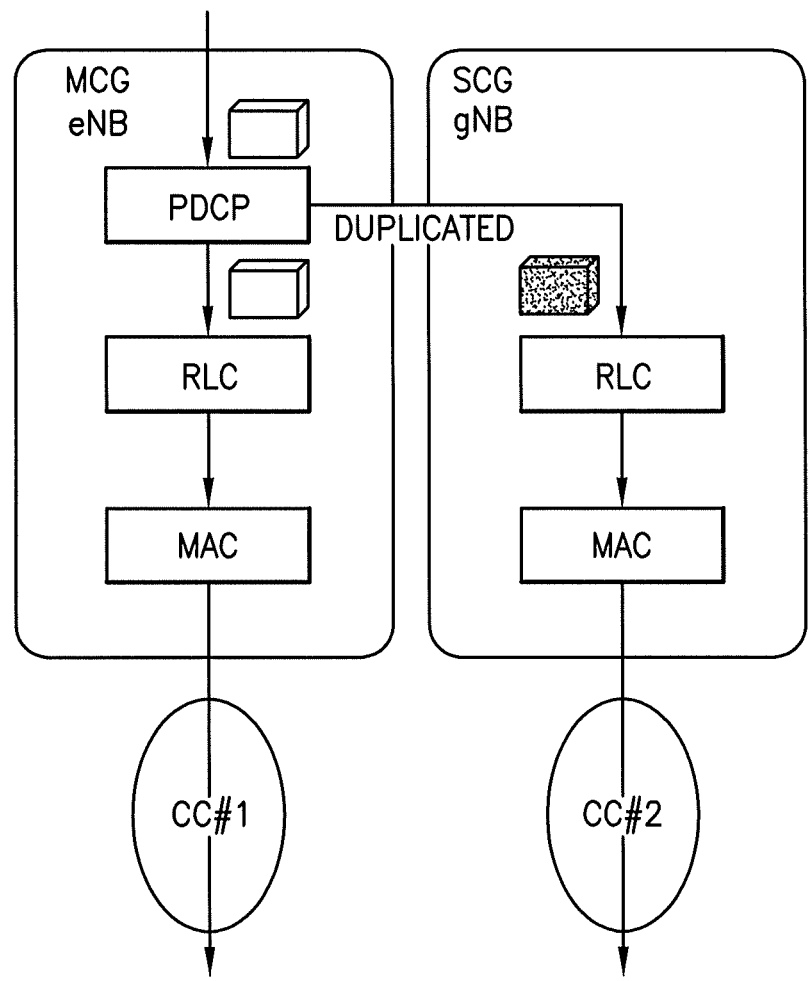
FIG. 5 shows an example block diagram of PDCP PDU duplication.

In the case of DC configured with split bearer, a PDCP PDU generated at the master node (referred to as master carrier group or MCG) is duplicated and transferred to the secondary node (referred to as secondary carrier group or SCG) via Xn interface. Then, the duplicated PDCP PDU is processed by the RLC/MAC/PHY layers of the SCG and transmitted over the air. The duplicated version of the PDCP PDU is thereby sent by the secondary connectivity. FIG. 5 illustrates an example of how PDCP duplication is carried out in a non-standalone 5G scenario with EN-DC configuration.

Although the illustrative examples provided in FIGS. 4 and 5 are downlink scenarios, the extension to uplink is straightforward.

Although PDCP duplication may allow the reliable and timely communication required by URLLC use cases, more radio resource will be used to transmit two copies of PDCP PDUs. Essentially, the required radio resource is doubled (two component carriers or two nodes are leveraged to transmit one PDCP PDU), which may be undesirable, for example in networks with heavy traffic loads. Moreover, it may be more power consuming for a UE to handle PDCP duplication in both uplink and downlink.

Figure 6:
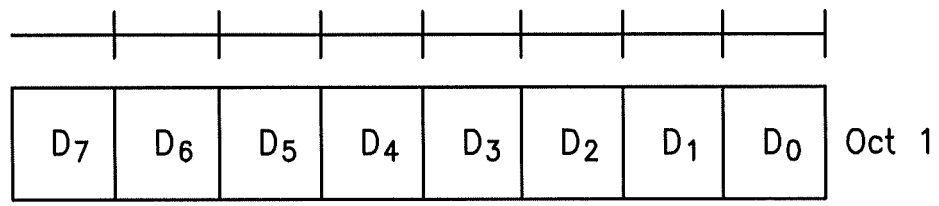
FIG. 6 shows an example MAC control element (CE)

In Release-15, to save the radio resource required for PDCP duplication, the duplication in uplink (UL) direction may be activated/deactivated by the gNB on a per-DRB basis. The RRC provides an initial configuration to the UE indicating whether PDCP duplication is applicable for each of the DRB. Afterwards, the activation status of duplication of each DRB configured with PDCP duplication is indicated via MAC CE command. According to TS 38.321, Duplication Activation/Deactivation MAC CE (as depicted in FIG. 6) may be multiplexed into MAC PDU, for activating or deactivating duplication for the DRBs in a more dynamic manner. For example, the field D, of the example MAC CE shown in FIG. 6 indicates the activation/deactivation status of the PDCP duplication of DRB i where i is the ascending order of the DRB ID among the DRBs configured with PDCP duplication and with RLC entity(ies) associated with this MAC entity. The Di field is set to one to indicate that the PDCP duplication of DRB i shall be activated. The Di field is set to zero to indicate that the PDCP duplication of DRB i shall be deactivated. If it is activated for a DRB, all PDCP PDUs associated to this DRB should be duplicated by the UE.

In Release-15, when duplication is activated for a DRB, all PDCP PDUs associated with the DRB are duplicated. This may still result in inefficient resource utilization as some duplication of some PDUs may be unnecessary. If a network would like to save radio resources (e.g. due to high load in a cell), it may choose to deactivate the duplication. For duplication over DC, in the current specifications, there is no coordination between the nodes on when to activate/deactivate the duplication and hence the duplication may still be activated while the original link is performing well enough or duplication may be deactivated by the secondary node (e.g. due to load conditions as mentioned above), even though the reliability on the original node is not sufficient.

Motivated by the need of efficiency improvement, L2/L3 solutions that may enhance resource efficiency for PDCP duplication are sought.

Figure 7:
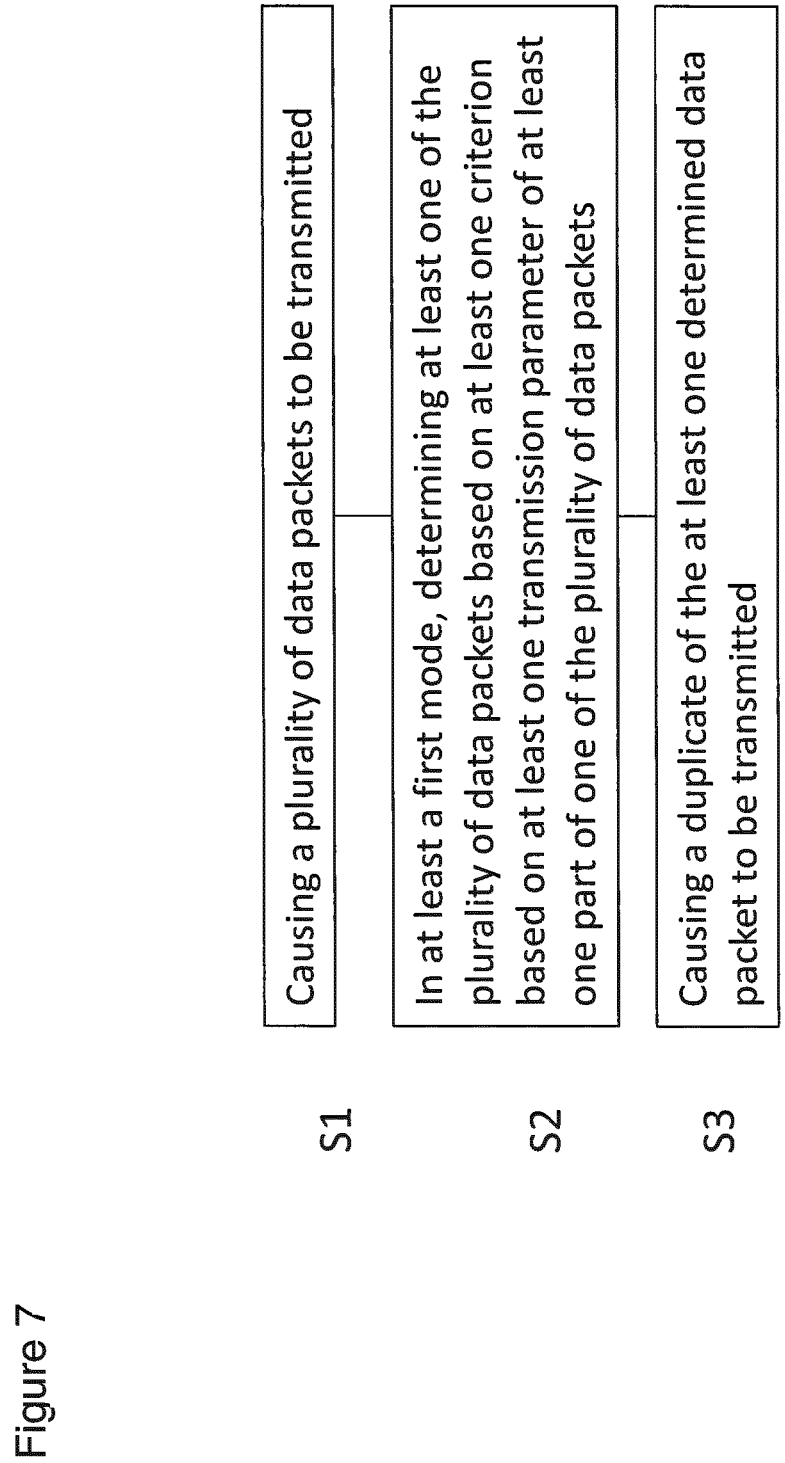
FIG. 7 shows a flowchart of a method according to an example embodiment.

FIG. 7 shows a flowchart of a method according to an example embodiment.

In a first step, S1, the method comprises causing a plurality of data packets to be transmitted.

In a second step, S2, the method comprises, in at least a first mode, determining at least one of the plurality of data packets based on at least one criterion based on at least one transmission parameter of at least one part of one of the plurality of data packets.

In a third step, S3, the method comprises causing a duplicate of the at least one determined data packet to be transmitted.

The method may be performed at a UE. In this case, the data packets (including the duplicates of the data packets) are caused to be transmitted in the uplink direction. The indication may be received from a base station, i.e. a gNB. The indication sent by the gNB could be conveyed by downlink messages originated from any protocol layers. For example, the indication may be sent in RRC reconfiguration messages, MAC CE, or Downlink Control Information (DCI).

Alternatively, or in addition, the method may be performed at a gNB, and the data packets (including the duplicates of the data packets) caused to be transmitted in the downlink direction. The data packets may be PDCP PDUs.

The plurality of data packets may be data packets associated with a radio bearer.

The method may comprise receiving an indication to operate in one of at least the first mode and a second mode, wherein in the second mode the apparatus comprises means for causing a duplicate of each of the plurality of data packets to be transmitted. The indication may be received from a base station, i.e. a gNB. The indication sent by the gNB could be conveyed by downlink messages originated from any protocol layers. For example, the indication may be sent in RRC reconfiguration messages, MAC CE, or Downlink Control Information (DCI).

The indication to perform duplication of data packets associated with a radio bearer in at least one of a first mode and a second mode may comprise a message that instructs a device to conduct PDCP duplication at either DRB-level or PDCP PDU level.

In the second mode, the duplicated data packets may be stored in a buffer. The duplicated data packets may be stored for a first time period.

The at least one criteria may be based on parameters of the data packet corresponding to the duplicated packet. The method may comprise receiving, from a lower layer, an indication of the parameters of the data packet corresponding to the duplicated packet.

There may be provided an entity capable of buffering the duplicated PDCP PDUs, receiving information relating to lower-layer configurations on the counterpart of the duplicated PDCP PDUs, and deciding whether the buffered PDCP PDUs should be further processed for transmission. An interface between lower layer (PHY/MAC/RLC) and PDCP layer may be used to convey information relating to lower-layer configurations of a PDCP PDU, or to trigger further processing for transmission of the duplicated PDCP PDUs. A timer may be provided that allows the device to know when the duplicated version of a PDCP PDU should be flushed from a buffer if it has not been further processed for transmission (i.e. that the first time period has expired).

The method may comprise receiving an indication of the criteria. The indication of the criteria may comprise a message that provides the criteria that a device uses to determine if a duplicated version of the PDCP PDU should be further processed for transmission. The method may comprise receiving an indication that the criteria are configured by a network or determined at the apparatus, e.g., a message that a UE should use criteria configured by the gNB or criteria the UE determined itself to conduct selective PDCP PDU duplication.

The criteria may be configured by a network (e.g. a gNB) or determined at the apparatus. That is, the method may be performed at a device (e.g. UE/gNB) capable of receiving the RRC message that provides the criteria relating to decision on whether the duplicated PDCP PDUs should be further processed and transmitted. Alternatively, the method may be performed at a device (e.g. UE/gNB) with a set of built-in criteria relating to a PDCP PDU, to determine if a duplicated version of the PDCP PDU should be further processed for transmission.

The method may allow a gNB to configure a UE to conduct PDCP duplication in different modes at different times. For example, the duplication can be either based on DRB level (first mode) or on PDCP PDU level (second mode). In the latter, not all duplicated PDCP PDUs associated with a DRB are processed and then transmitted. A gNB is able to instruct a UE to duplicate and process all PDCP PDUs, or only process and transmit the duplicated PDCP PDUs when certain conditions relating to lower layer status of the original PDCP PDUs are met.

Figure 8:
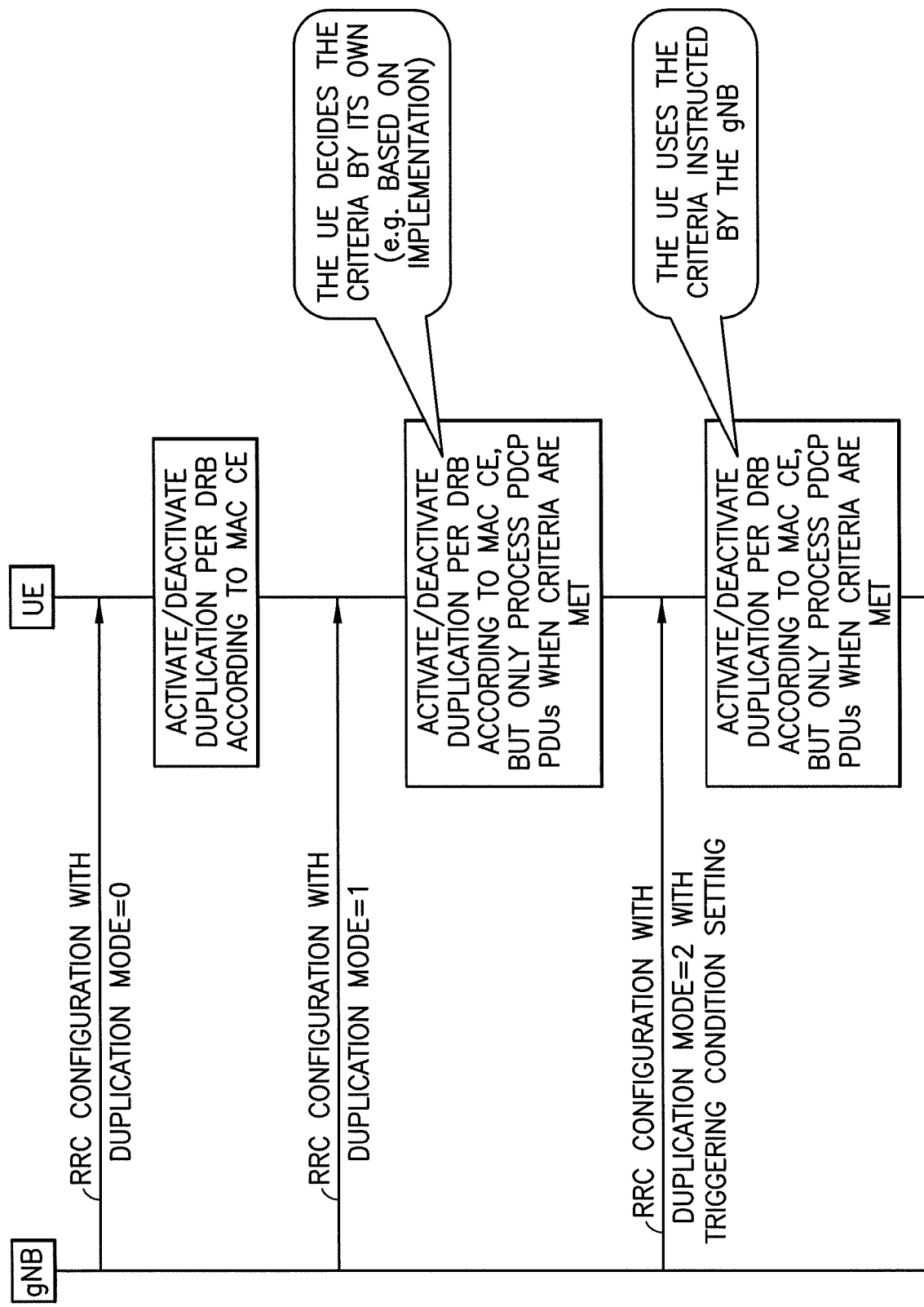
FIG. 8 shows a signalling flow according to an example embodiment.

In an example embodiment, illustrated in FIG. 8, a gNB includes an information element in the RRC message to configure a UE to activate PDCP duplication with in one of three Duplication Modes. In the first mode (Duplication Mode 0) all PDCP PDUs associated with a DRB with duplication activated should be duplicated and processed. In the second mode (Duplication Mode 1), only a subset of PDCP PDUs should be duplicated and processed, depending on the whether the triggering condition determined by UE itself is met. In a third mode (Duplication Mode 2), only a subset of PDCP PDUs should be duplicated and processed, depending on the whether the triggering condition configured by the gNB is met.

Both Duplication Mode 1 and Duplication Mode 2 involve selective processing of duplicated PDUs, but with a difference in how the selection criteria is provided. In an alternative exemplary embodiment, the gNB indicates either Duplication Mode 0 (DRB-based duplication) and Duplication Mode 1 (Selective PDU duplication) in the RRC message, and when Duplication mode 1 is indicated, the gNB further configures selection criteria with a possible option which instructs the UE to decide the criteria itself.

In practice, the network may only configure Mode 0 or Mode 2 (with no Mode 1 as described with reference to FIG. 8), as it may be difficult to control UE behaviour if the UE is able to decide the criteria itself.

Examples of procedures/entities to fulfil selective PDCP PDUs duplication when a second mode is configured are provided.

When Duplication Modes with selective PDU duplication is configured (e.g. Duplication Mode 1 and 2 mentioned above), a method as depicted in FIG. 9 may be applied to conduct PDCP duplication. Unless otherwise specified, in the following the terms "original branch" and "duplication branch" are used to represent L2/L1 protocol stacks for the original PDUs and duplicated PDUs respectively.

Figure 9:
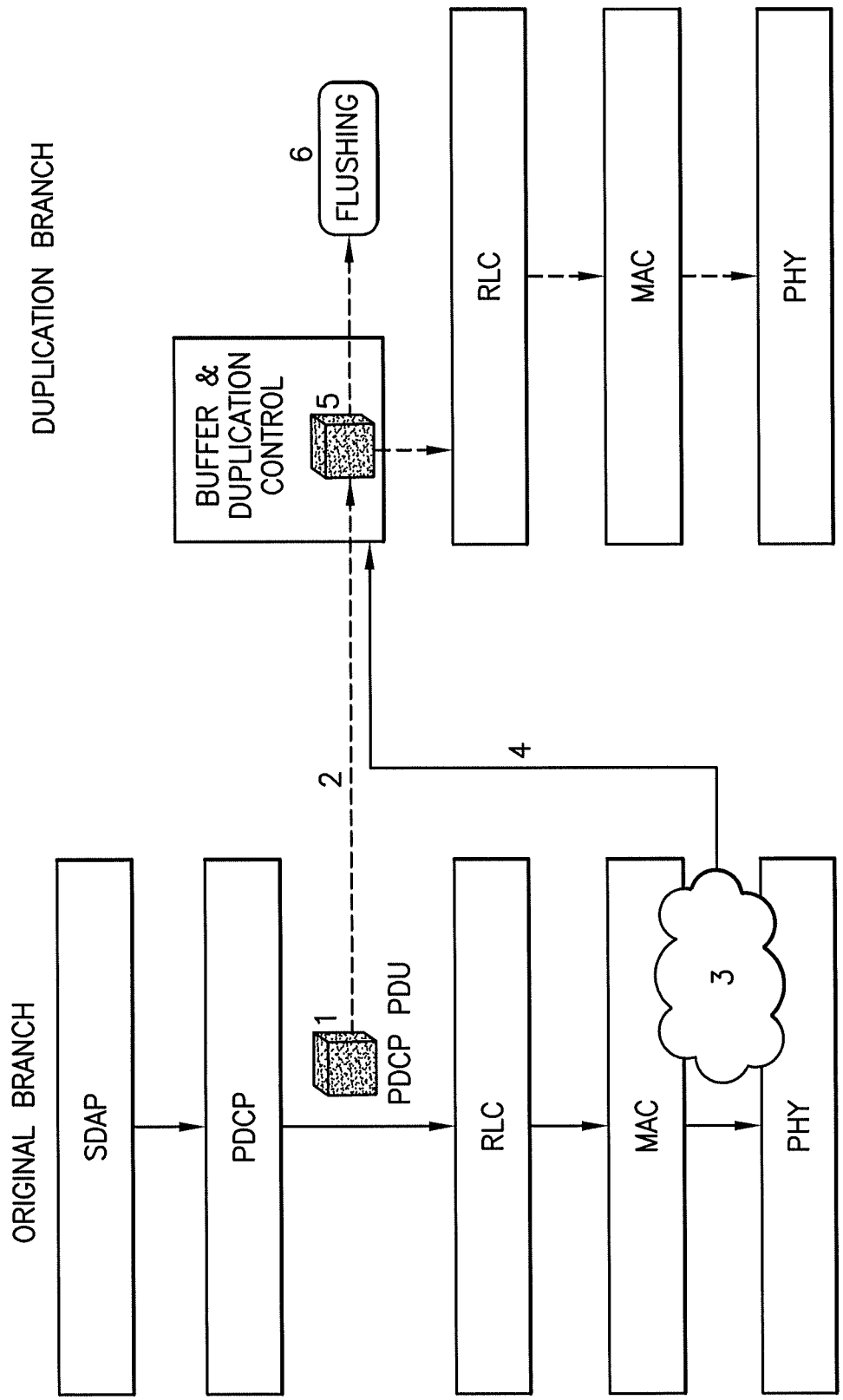
FIG. 9 shows a block diagram of PDCP PDU duplication according to an example embodiment.

In the example shown in FIG. 9, a PDCP PDU associated with a DRB is generated by a PDCP sublayer of the original branch.

Assuming PDCP duplication is activated for this DRB, the generated PDCP PDU is duplicated. The duplicated version is transferred to a buffer and duplication control entity in the duplication branch—logically sitting above the RLC sublayer of the duplication branch. The duplicated PDCP PDU is buffered and stored in this entity. Also, a timer with a pre-configured expiry time starts as soon as this duplicated PDCP PDU is stored in the buffer.

The PDCP PDU in the original branch is further processed by protocol layers lower than PDCP, including RLC, MAC, and PHY, for transmission. Certain configurations relating to transmission of this PDCP PDU (or a part of this PDCP PDU—because the PDCP PDU may be segmented throughout the processing steps) over the air interface, such as modulation & coding scheme (MCS), HARQ setting, grant type, repetition setting, and transmission power level etc, are provided by the MAC and PHY layers.

The information relating to MAC/PHY configurations of a PDCP PDU (or a part of PDCP PDU) is transferred to the buffer and duplication control entity in the duplication branch. By comparing the received information, the buffer and duplication control entity decides whether the duplicated PDCP PDU should be further processed by the lower lowers in the duplication branch. The decisions may be based on a set of pre-configured criteria. Alternatively, the decision could be made by an entity in the original branch, which then transfer its decision to the buffer & duplication control entity in the duplication branch.

If it is decided that the duplicated PDCP PDU should be further processed for transmission, the buffer & duplication control entity should pass the buffered the duplicated PDCP PDU to the RLC layer. The timer stops and resets.

If it has decided not to further process the duplicated PDCP PDU and the timer expires, the buffer and duplication control entity flush the duplicated PDCP PDU from the buffer. Note that flushing could happen in any places of the protocol stack, depending on where the duplications are buffered.

In FIG. 9, the duplicated PDCP PDUs are buffered above RLC sublayer, as an example, until the triggering conditions are met, or a timer expires. The buffer may be placed elsewhere. For instance, the duplicated PDCP PDUs can be processed by the RLC sublayer (and hence become RLC PDUs) regardless of whether the triggering conditions are met, and the RLC PDUs may be buffered above MAC layer. Alternatively, the PDUs may be buffered at the original branch, duplications and transferring to the duplication branch only occur when the triggering conditions are met— this may reduce the required data exchange between the two branches.

Figure 10:
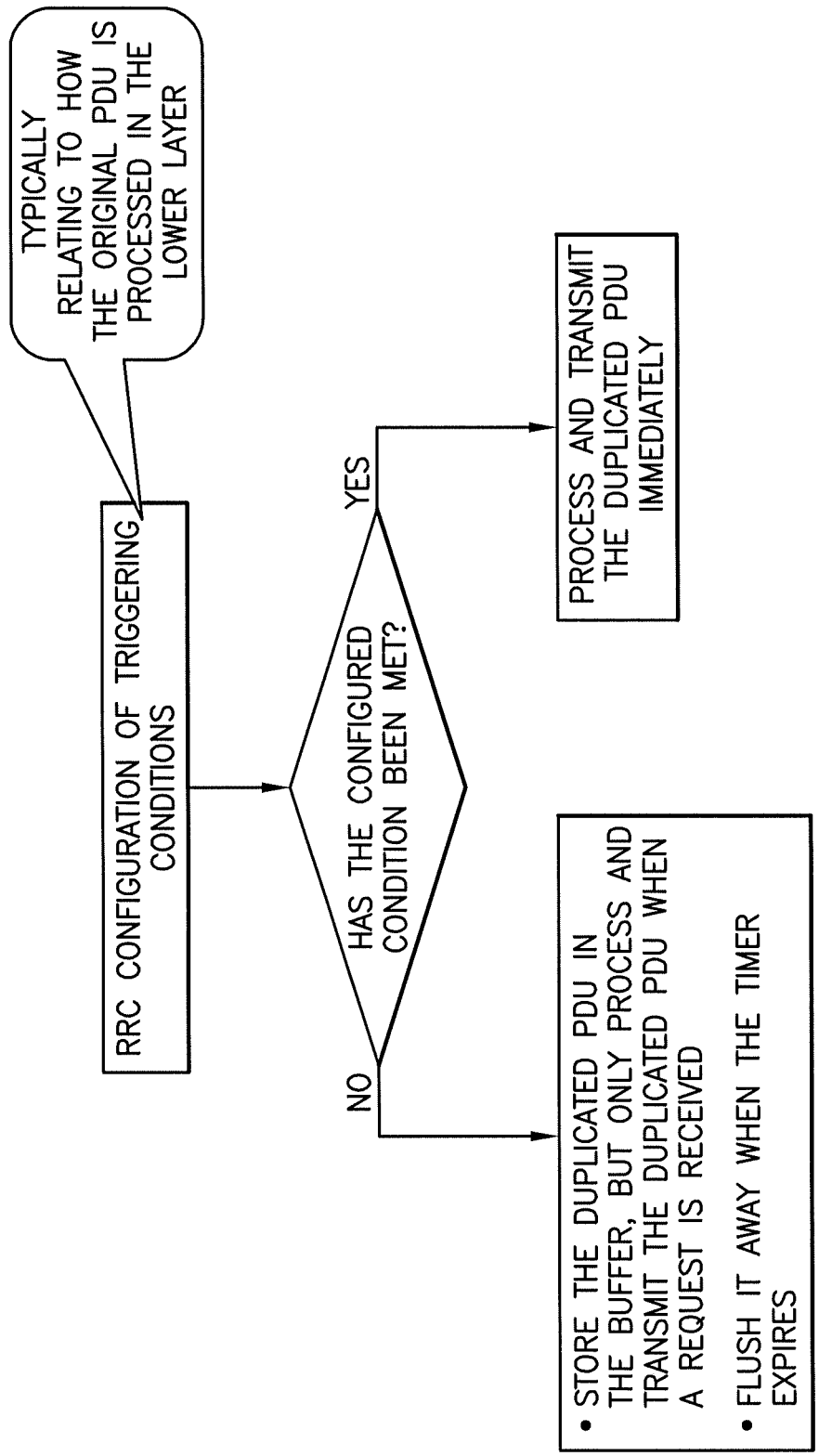
FIG. 10 shows a decision logic according to an example embodiment.
Figure 11:
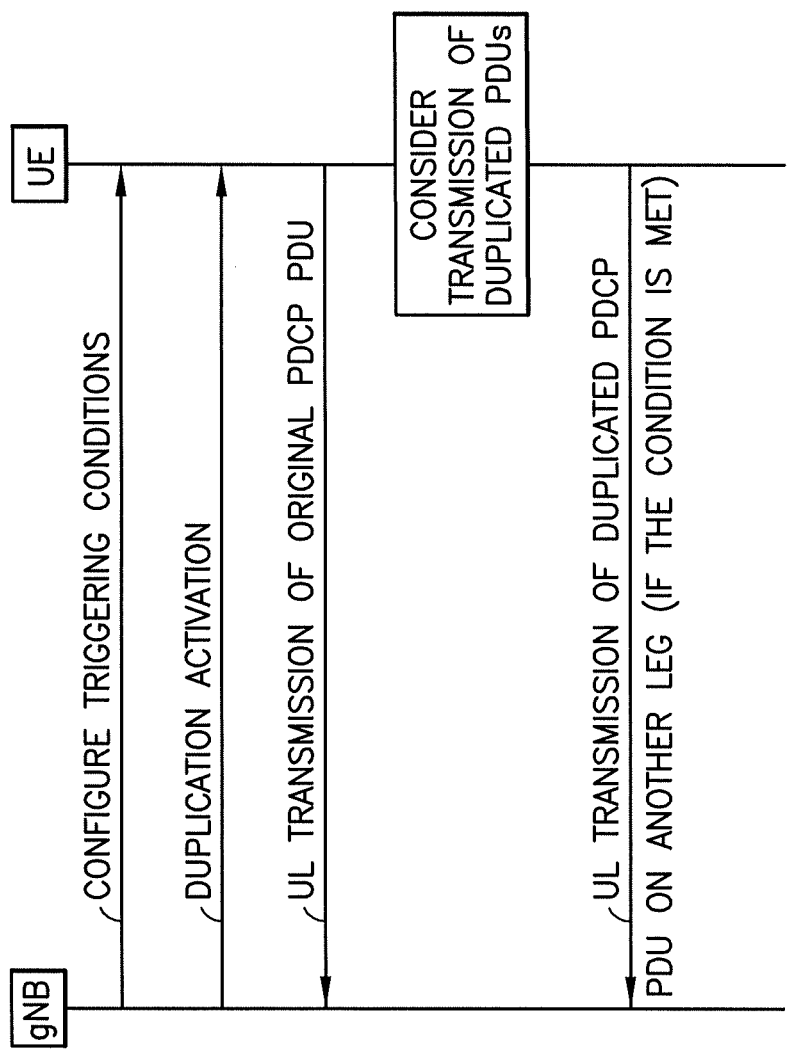
FIG. 11 shows a signalling flow according to an example embodiment.

FIG. 10 shows an example decision logic for determining whether a duplicated PDCP PDU should be further processed and transmitted. In the example shown in FIG. 10, the criteria are configured by the RRC.

Either the original branch or duplication branch (depending on which branch is the decision maker) is aware of a set of decision criteria. The criteria may be pre-configured as a part of implementation and may be dynamically updated or temporarily modified in accordance to the prevailing network status. For uplink PDCP PDU duplication, the UE may obtain the criteria via RRC configuration by the gNB.

The RRC configurations of such criteria may be updated by the gNB periodically. In the case where the UE does not receive a further update within the period, the UE may continue to use the last configured criteria or fall back to its default setting.

The network side may determine the criteria based on the prevailing status. For instance, when traffic load is heavy, the gNB may set stricter criteria to avoid too much duplicated transmission over the air interface. Conversely, when traffic load is relatively light, the gNB may set more relaxed criteria to encourage duplicated transmission for sake of reliable and low latency communications.

Some exemplary embodiments of the decision criteria may be as follows.

The decision criteria may comprise the MCS index, For example the criteria may be whether the MCS index configured for some or all TBs encompassing the original PDCP PDU (or part of original PDCP PDU) is higher or lower than a threshold level.

For example, if the MCS threshold in the triggering criteria is given as QPSK with a coding rate 0.3333, then the duplicated PDCP PDU should be processed and transmitted if its counterpart is to be transmitted with a TB configured with a modulation order higher than QPSK or a coding rate higher than 0.3333.

Alternatively, if the MCS threshold in the triggering criteria is given as 16-QAM with a coding rate 0.3333, then the duplicated PDCP PDU should be processed and transmitted if its counterpart is to be transmitted with a TB configured with a modulation order lower than 16-QAM or a coding rate lower than 0.3333.

In another example, the MCS threshold may be given by a reference to MCS index as specified in 3GPP TS 38.214 section 5 and 6, potentially together with the criteria given above (e.g. used modulation). UE should only send the duplicate in case MCS index used on the original leg is higher/lower than the threshold.

The criteria may be if transmission power level configured for some or all TBs encompassing the original PDCP PDU (or part of original PDCP PDU) is lower or higher than a threshold level.

The criteria may be thee power headroom (PHR) of the UE. When the PHR of the UE is smaller than a threshold, it might be more likely that the UE would be unable to ensure the reliability of the TB on a single link, and therefore it could be better to split the UE's available power and exploit diversity by duplication.

The criteria may be that the number of HARQ NACK corresponding to the TB or CBG encompassing the original PDCP PDU (or part of original PDCP PDU) is larger than $N \geq 1$. Thus, the processing and transmission of the duplicated PDU automatically begin as soon as the first NACK indication is received at the original branch.

The criteria may be the grant type associating to transmission of the TB encompassing the original PDCP PDU (or part of original PDCP PDU): Dynamic grant or Configured Grant.

The criteria may be the contents of control information associated with transmission of the TB encompassing the original PDCP PDU (or part of original PDCP PDU), such as an indication conveyed by downlink control information (DCI).

The criteria may be the number of repetition configured for the transmission of the TB encompassing the original PDCP PDU (or part of original PDCP PDU).

The criteria may be the numerology (subcarrier spacing) used for transmission of the TB encompassing the original PDCP PDU (or part of original PDCP PDU).

The criteria may be the resultant PDSCH/PUSCH duration for transmission of the TB encompassing the original PDCP PDU (or part of original PDCP PDU).

The criteria may be the MIMO codebook type: whether the configured precoder is derived from limited feedback (CSI Type 1) or explicit feedback (CSI Type 2)

The criteria may be that the number of rank: whether the TB encompassing the original PDCP PDU (or part of original PDCP PDU) is transmitted with spatial multiplexing (rank>1) or not.

The criteria may be Resource Orthogonality: whether the TB encompassing the original PDCP PDU (or part of original PDCP PDU) Is transmitted with an orthogonal multiple access (OMA) scheme or a non-orthogonal multiple access (NOMA) scheme.

The criteria may be the detection of beam/link failure at the original branch. For example, if beam recovery is triggered at the original branch, the duplication branch should automatically begin processing the duplicated PDCP PDUs.

The criteria may be the size of bandwidth or bandwidth part configured for the original branch. For example, the duplication branch should automatically begin processing the duplicated PDCP PDUs if the bandwidth size configured for the original branch is smaller or larger than a threshold.

The criteria may be that the transmission of the original branch is configured on an unlicensed band (which is subject to "listen before talk" and could be delayed) instead of a licensed band.

The criteria are configured to the UE by the base station, while many of the parameters for uplink data transmission are also set by the base station (such as MCS, transmission power, and bandwidth allocation). Therefore, the base station may implicitly control whether a PDCP PDU duplicate should be processed and transmitted by a UE, by coordinating both RRC configurations (for criteria setting) and lower layer configurations (for parameter settings) for uplink data transmission.

When the criteria for further processing and transmission of the duplicated PDCP PDUs are met, the proposed scheme may be enforced to carry out transmission of duplicated PDCP PDUs by using pre-allocated radio resources (such as PUSCH relating to Configured Grants in 5G NR). This may allow duplicated transmission to be launched quickly without potential latency caused by procedures for scheduling request (SR), buffer status report (BSR), and resource allocation. Such enforcement may be implemented as instructions by the gNB to the UE. For example, the mechanisms based on Logical Channel Prioritization (LCP) Restriction configured by RRC may be applied, which enforces that logical channels associated with the uplink duplicated packets are only allowed to be mapped to physical radio resources relating to Configured Grants.

In some implementations it may be challenging to map physical layer triggers (such as MCS Index provided in DCI or power used to transmit a specific PDSCH transmission etc.) to a particular PDCP PDU as this may involve extensive inter-layer information exchange. Therefore, the criteria mentioned above may be provided together with a timer T during which the UE would analyse whether those are met on the leg where original PDCP PDUs are sent.

Taking transmission power level as an example, UE could analyse whether the average power level for PUSCH transmissions on original leg during configured time T are above a configured threshold and activate duplication only after this time (i.e. start sending PDCP PDU from duplication buffer over the secondary leg). If the average power drops below a configured threshold during another time (which may be the same as T), then duplication is deactivated. Another possibility is not to use average, but assume that all transmission within configured time T would be configured with power level above a threshold.

Similar reasoning may be applied to other criteria mentioned above. Instead of a timer, a number of transmissions N could be used to determine whether to activate/deactivate the duplication, i.e. in case e.g. N consecutive grants are using MCS index above a threshold, then duplication should be automatically enabled.

The method may improve resource efficiency of PDCP duplication by avoiding unnecessary transmission of redundant packets.

Although the example above largely relates to uplink, the proposed scheme is applicable to downlink as well, where the base station can determine how the packets should be selectively processed when PDCP duplication is activated. In downlink cases, the criteria settings may be determined by the base station itself (instead of RRC configuration as in the uplink cases).

In Rel-15, the gNB is able to flush away the duplicated packets in the buffer if RLC Acknowledgement is received at the original branch. However, there is a potential delay due to the waiting time of ACK/NACK feedback, as well as notification between the two branches (especially when the two branches could be geographically separated as in DC cases). By comparison, the proposed scheme may avoid the waiting time and improve the latency.

The method may be implemented in a user equipment as described with reference to FIG. 2 or a control apparatus as described with reference to FIG. 3. An apparatus may comprise means for causing a plurality of data packets to be transmitted, in at least a first mode, determining at least one of the plurality of data packets based on at least one criterion based on at least one transmission parameter of at least one part of one of the plurality of data packets and causing a duplicate of the at least one determined data packet to be transmitted.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to URLLC similar principles can be applied in relation to other networks and communication systems where packet duplication is performed. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising:
   at least one processor; and
   at least one non-transitory memory storing instructions that, when executed by the at least one processor, cause the apparatus at least to:
   cause a plurality of data packets to be transmitted;
   determine, with a user equipment, at least one criterion in connection with at least one transmission parameter of at least one part of one of the plurality of data packets;
   wherein the apparatus comprises the user equipment;
   determine at least one of the plurality of data packets based on the at least one criterion in connection with the at least one transmission parameter of the at least one part of one of the plurality of data packets;
   determine whether the at least one criterion is met;
   cause a duplicate of the at least one determined data packet to be transmitted, when the at least one criterion determined with the user equipment is met; and
   buffer the duplicate with a duplication control entity above a radio link control sublayer of a duplicate protocol stack of the user equipment, the duplication control entity configured to determine whether to cause the duplicate of the at least one determined data packet to be transmitted;
   wherein the plurality of data packets is transmitted with an original protocol stack of the user equipment.

2. The apparatus of claim 1, wherein the plurality of data packets comprises data packets associated with a radio bearer.

3. The apparatus of claim 1, wherein the apparatus is further caused to:
receive an indication to operate in one of at least a first mode, a second mode, or a third mode;
wherein the first mode indicates to the user equipment to cause a respective duplicate of a respective data packet of the plurality of data packets to be transmitted;
wherein the second mode indicates to the user equipment to determine, with the user equipment, the at least one criterion in connection with the at least one transmission parameter of the at least one part of one of the plurality of data packets;
wherein the third mode indicates to the user equipment that the at least one criterion in connection with the at least one transmission parameter of the at least one part of one of the plurality of data packets is received from a network node.

4. The apparatus of claim 1, wherein the apparatus is further caused to receive an indication to transmit the duplicate of the at least one determined data packet in at least one reserved radio resource comprising at least one physical uplink shared channel.

5. The apparatus of claim 1, wherein the apparatus is further caused to receive an indication to transmit the duplicate of the at least one determined data packet in at least one reserved radio resource, wherein the indication comprises configuration of logical channel prioritization restrictions.

6. The apparatus of claim 1, wherein the instructions, when executed by the at least one processor, cause the apparatus at least to:
configure a timer comprising a time period during which the user equipment determines whether the at least one criterion is met; and
cause the duplicate of the at least one determined data packet to be transmitted, when the at least one criterion is met is at a time within the time period.

7. The apparatus of claim 1, wherein the instructions, when executed by the at least one processor, cause the apparatus at least to:
cause the duplicate of the at least one determined data packet to be transmitted, when the at least one criterion determined with the user equipment is not met, in response to receiving a request.

8. The apparatus of claim 1, wherein the apparatus is further caused to:
store a duplicate of at least one other data packet in a buffer for a first time period, the first time period given with a timer;
start the timer, in response to storing the duplicate of the at least one other data packet in the buffer; and
remove the duplicate of the at least one other data packet from the buffer, in response to determining not to transmit the duplicate of the at least one other data packet, or upon expiration of the timer.

9. The apparatus of claim 1, wherein the at least one criterion in connection with the at least one transmission parameter comprises one of:
a modulation order of the at least one part of the at least one data packet being higher than a quadrature phase shift keying value, or lower than a quadrature amplitude modulation value,
a modulation and coding scheme index of the at least one part of the at least one data packet being higher or lower than a modulation and coding scheme index threshold,
a code rate of the at least one part of the at least one data packet being higher or lower than a code rate threshold value,
a transmission power of the at least one part of the at least one data packet being higher or lower than a transmission power threshold value,
a number of negative acknowledgements received in response to transmission of data of the at least one data packet being higher than a negative acknowledgement threshold, wherein the duplicate is transmitted when the number of negative acknowledgements is higher than the negative acknowledgement threshold, or
a grant type associated with transmission of the at least one part of the at least one data packet being dynamic or configured.

10. The apparatus of claim 1, wherein the data packets are protocol data units (PDUs) of a packet data convergence protocol (PDCP) sublayer.

11. The apparatus of claim 1, wherein the at least one transmission parameter comprises a spatial multiplexing rank of the at least one part of the at least one data packet.

12. The apparatus of claim 1, wherein the instructions, when executed by the at least one processor, cause the apparatus at least to:
update the at least one criterion based on a current network status.

13. The apparatus of claim 1, wherein the apparatus is further caused to:
receive, from a lower layer, an indication of the at least one transmission parameter related to processing of the duplicate of the at least one determined data packet, wherein the lower layer comprises a physical layer, medium access control layer, or a radio link control layer.

14. The apparatus of claim 1, wherein the apparatus is further caused to:
cause the plurality of data packets to be transmitted on a first carrier frequency, and the duplicate of the at least one determined data packet to be transmitted on a second carrier frequency different from the first carrier frequency.

15. The apparatus of claim 1, wherein the at least one criterion in connection with the at least one transmission parameter comprises:
a power headroom of the apparatus at the time of transmission of the at least one part of the at least one data packet being smaller than a threshold, and the apparatus causes the duplicate of the at least one determined data packet to be transmitted when the power headroom of the apparatus is smaller than the threshold.

16. The apparatus of claim 1, wherein the instructions, when executed by the at least one processor, cause the apparatus at least to:
receive an indication to operate in one of at least a first mode, a second mode, or a third mode;
when the indication comprises the first mode, the indication causes the user equipment to:
cause a respective duplicate of a respective determined at least one of the plurality of data packets to be transmitted;
when the indication comprises the second mode, the indication causes the user equipment to:
determine, with the user equipment, the at least one criterion in connection with the at least one transmission parameter of the at least one part of one of the plurality of data packets, based on implementation;

determine the at least one of the plurality of data packets based on the at least one criterion in connection with the at least one transmission parameter of the at least one part of one of the plurality of data packets;
determine whether the at least one criterion based on implementation is met; and
cause the duplicate of the at least one determined data packet to be transmitted, when the at least one criterion determined with the user equipment based on implementation is met; and
when the indication comprises the third mode, the indication causes the user equipment to:
determine, with the user equipment, the at least one criterion in connection with at least one transmission parameter of the at least one part of one of the plurality of data packets, the at least one criterion having been configured with a network node;
determine the at least one of the plurality of data packets based on the at least one criterion in connection with the at least one transmission parameter of the at least one part of one of the plurality of data packets;
determine whether the at least one criterion configured with the network node is met; and
cause the duplicate of the at least one determined data packet to be transmitted, when the at least one criterion configured with the network node is met.

17. The apparatus of claim 1, wherein the at least one transmission parameter comprises at least one of:
a subcarrier spacing of the at least one part of the at least one data packet, or
a number of repetitions associated with transmission of the at least one part of the at least one data packet.

18. The apparatus of claim 1, wherein the at least one transmission parameter comprises at least one of:
a multiple-input-multiple-output codebook type of the at least one part of the at least one data packet, the type indicating whether a precoder is derived from limited feedback or explicit feedback,
a resource orthogonality mode of the at least one part of the at least one data packet, the resource orthogonality mode being orthogonal multiple access or non-orthogonal multiple access, or
a transmission duration of the at least one part of the at least one data packet.

19. The apparatus of claim 1, wherein the instructions, when executed by the at least one processor, cause the apparatus at least to:
determine, with a control entity of the original protocol stack of the user equipment, to cause the duplicate of the at least one determined data packet to be transmitted; and
transfer the determination of the control entity, to cause the duplicate of the at least one determined data packet to be transmitted, to the duplication control entity of the duplicate protocol stack of the user equipment.

20. The apparatus of claim 1, wherein the instructions, when executed by the at least one processor, cause the apparatus at least to:
buffer the duplicate above a radio link control sublayer of an original protocol stack of the user equipment;
determine, with a control entity of the original protocol stack of the user equipment, to cause the duplicate of the at least one determined data packet to be transmitted; and
transfer the duplicate of the at least one determined data packet to be transmitted to the duplication control entity of the duplicate protocol stack of the user equipment for transmission.

21. The apparatus of claim 1, wherein the at least one criterion in connection with the at least one transmission parameter comprises at least one of:
a bandwidth of the at least one part of the at least one data packet being smaller or larger than a bandwidth threshold,
a beam failure or beam recovery status being configured for the at least one part of the at least one data packet,
a status of spectrum used for transmission of the at least one part of the at least one data packet being licensed or unlicensed,
traffic load being above a traffic threshold, wherein when the traffic load is above the traffic threshold, the apparatus determines not to duplicate at least one other of the plurality of data packets, or
traffic load being below a traffic threshold, wherein the duplicate of the at least one determined data packet is transmitted when the traffic load is below the traffic threshold.

22. The apparatus of claim 1, wherein the instructions, when executed by the at least one processor, cause the apparatus at least to:
temporarily modify the at least one criterion based on a change to a network status; and
undo the temporary modification of the at least one criterion based on a current network status.

23. A method comprising:
causing a plurality of data packets to be transmitted;
determining, with a user equipment, at least one criterion in connection with at least one transmission parameter of at least one part of one of the plurality of data packets;
determining at least one of the plurality of data packets based on the at least one criterion in connection with the at least one transmission parameter of the at least one part of one of the plurality of data packets;
determining whether the at least one criterion is met;
causing a duplicate of the at least one determined data packet to be transmitted, when the at least one criterion determined with the user equipment is met; and
buffering the duplicate with a duplication control entity above a radio link control sublayer of a duplicate protocol stack of the user equipment, the duplication control entity configured to determine whether to cause the duplicate of the at least one determined data packet to be transmitted;
wherein the plurality of data packets is transmitted with an original protocol stack of the user equipment.

24. A non-transitory computer readable medium comprising program instructions for causing an apparatus to at least:
cause a plurality of data packets to be transmitted;
determine, with a user equipment, at least one criterion in connection with at least one transmission parameter of at least one part of one of the plurality of data packets;
determine at least one of the plurality of data packets based on the at least one criterion in connection with the at least one transmission parameter of the at least one part of one of the plurality of data packets;
determine whether the at least one criterion is met;
cause a duplicate of the at least one determined data packet to be transmitted, when the at least one criterion determined with the user equipment is met; and buffer the duplicate with a duplication control entity above a radio link control sublayer of a duplicate protocol stack of the user equipment, the duplication control entity configured to determine whether to cause the duplicate of the at least one determined data packet to be transmitted;

wherein the plurality of data packets is transmitted with an original protocol stack of the user equipment.

\* \* \* \* \*